United States Patent [19]

Athearn et al.

[11] 4,315,974
[45] Feb. 16, 1982

[54] ELECTROCHEMICAL CELL WITH PROTECTED ELECTRICAL FEEDTHROUGH

[75] Inventors: Lee F. Athearn, Fridley; William J. Morrissey, Champlin, both of Minn.

[73] Assignee: Medtronic, Inc., Minneapolis, Minn.

[21] Appl. No.: 901,596

[22] Filed: May 1, 1978

[51] Int. Cl.³ .................................. H01M 2/06
[52] U.S. Cl. .................... 429/181; 429/185
[58] Field of Search .................. 429/174, 181, 185

[56] References Cited

U.S. PATENT DOCUMENTS

| | | | |
|---|---|---|---|
| 3,416,964 | 12/1968 | Michalko | 429/181 |
| 3,421,945 | 1/1969 | Michalko | 429/181 |
| 3,874,929 | 4/1975 | Greatbatch | 429/181 |
| 4,061,841 | 12/1977 | Sharma et al. | 429/174 |
| 4,112,204 | 9/1978 | McRae | 429/181 |
| 4,128,703 | 12/1978 | Mead et al. | 429/101 |
| 4,168,351 | 9/1979 | Taylor | 429/181 |

*Primary Examiner*—Donald L. Walton
*Attorney, Agent, or Firm*—Schroeder, Siegfried, Vidas, Steffey & Arrett

[57] ABSTRACT

Electrical feedthrough seal, such as a glass-to-metal seal, including a protective ceramic body which shields at least portions of the inner surfaces of the glass seal. The ceramic body is preferably disposed about the leadwire of the feedthrough.

7 Claims, 4 Drawing Figures

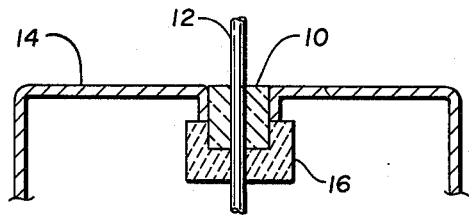
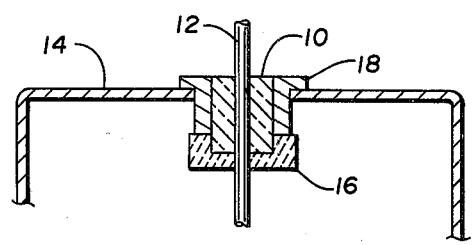
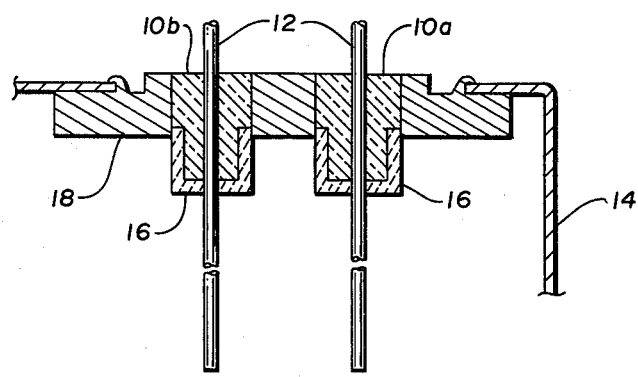
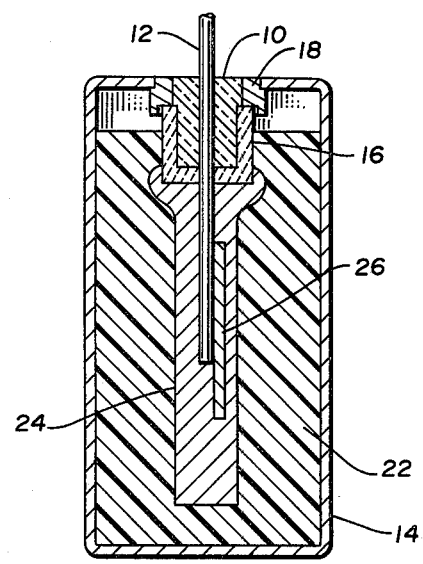
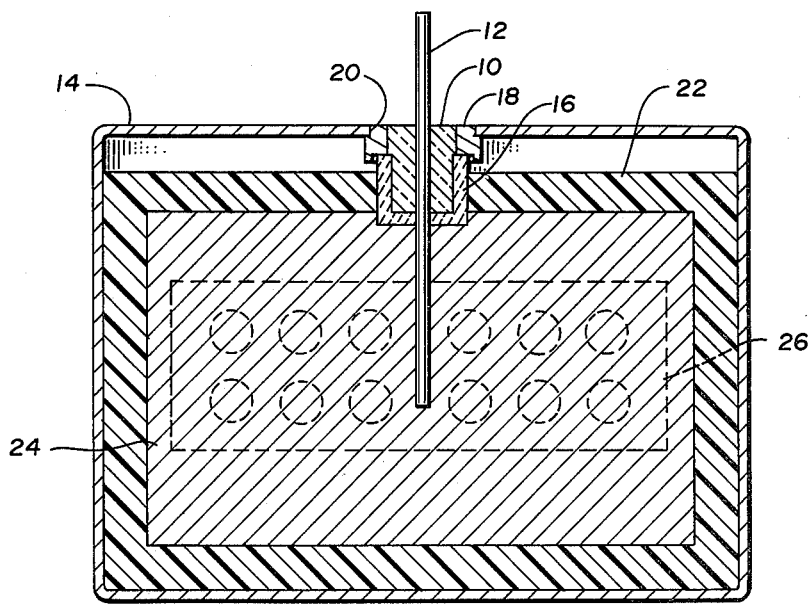

ELECTROCHEMICAL CELL WITH PROTECTED ELECTRICAL FEEDTHROUGH

BACKGROUND

Encapsulated electrical devices, such as electrochemical cells, specifically those of the lithium/iodine type which include a charge transfer complex compound of iodine and an organic constituent, the lithium being the anode, include electrical lead-wires which must extend from the interior of the device through the casing thereof to the exterior. The lead-wire is ordinarily sealed to the device casing by an insulating glass seal or glass-to-metal seal in order to hermetically seal the device. In some instances particularly in the case of electrochemical cells, the device contents, for example the lithium anode, may adversely affect the glass portion of the seal by chemical interaction therewith or may be otherwise incompatible.

It is a purpose of this invention to protect glass seals used in encapsulated electrical devices from such attack, particularly any inner portions thereof which are exposed to components tending to react with or attack the glass.

SUMMARY OF THE INVENTION

The invention provides a protective inner ceramic body which is sealed to an inner glass portion of the seal means in a protective relationship so as to shield exposed inner portions of the glass from inner attack by incompatible contents of the device. Not all of the inner glass need be shielded, only those portions exposed to incompatible components. The invention contemplates complete inner shielding as well as partial inner shielding of the glass surface.

BRIEF DESCRIPTION OF THE DRAWINGS

FIGS. 1, 2, and 3 represent various embodiments of the invention in the form of glass-to-metal seals and are shown in cross section.

FIGS. 4 and 5 show an electrochemical cell of the lithium/iodine type in cross section, front and end elevations respectively, the cell including a protected glass seal according to the invention.

DESCRIPTION OF THE PREFERRED EMBODIMENTS

The electrical feedthroughs shown in FIGS. 1-3 represent several variations of the invention. In the feedthrough of FIG. 1, a body of sealing glass 10 seals a pin 12 directly to a metal casing 14 of an encapsulated electrical device (shown partially). A ceramic cover 16 shields the inner exposed surface of the glass from the contents of the device. Ceramic cover 16 is preferably cup-shaped and fits around lead-wire or metal pin 12 to cover the inner portion of glass seal 10 as shown. Cover 16 and glass 10 are sealed to each other by fusing of the glass.

FIGS. 2 and 3 show electrical feedthroughs in which the glass-to-metal seal has been constructed as a separate entity before being incorporated into the metal casing 14 of an encapsulated electrical device. In these embodiments, the glass-to-metal seal means comprises a peripheral metal portion 18 and glass portion 10 which has been fused both to the lead-wire or lead-wires 12 and to peripheral metal portion 18. Metal portion 18, for example, may be a metal ferrule. In the embodiment of FIG. 3 two separate glass seals are utilized, i.e. 10a and 10b, the peripheral metal portion 18 having two openings for receiving the lead-wires 12 and glass seals 10. Ceramic covers 16 are fitted over the lead-wires 12 to cover and seal inner exposed portions of glass seals 10 as before. With these embodiments, the assembled glass-to-metal seal is then welded to casing 14 of the encapsulated device to form a hermetic assembly.

Referring to FIG. 4, the advantages of the invention become more readily apparent in this preferred use, i.e. in electrochemical cells. FIG. 4 is illustrative of an electrochemical battery construction. This particular battery is of the lithium/iodine type and includes a container or casing 14 which is preferably of stainless steel. The casing has an opening generally indicated at 20 into which an electrical feedthrough according to the invention is hermetically sealed. Since the feedthrough is of the type shown in FIGS. 2 and 3, the peripheral metal portion 18 of the feedthrough is welded to casing 14 as shown and the glass is sealed by fusing to metal portion 18. The contents of the cell include a cathode 22 which takes the form usually of a pasty material comprised of an organic polymer such as poly-two-vinylpyridine which has been complexed with iodine to form an organic-iodine complex compound. Additional amounts of free iodine may also be included in such a material. As shown in FIG. 4, contact between cathode 22 and metal casing 14 provides for electrical battery cathode contact. The anode 24 of the cell may consist of a body of lithium metal incorporating an anode collector 26 which is connected to lead-wire 12 as shown. Ceramic cover 16 interiorly shields glass 10 from the contents of the cell, particularly from the lithium anode 24, which tend to displace sodium in the glass seal or otherwise chemically attack it.

In this particular electrochemical cell, it is not necessary that the entire inner portion of glass 10 be shielded by ceramic cover 16. For example, cathode materials 22 do not attack the glass. Therefore, those portions of the glass exposed to the cathode need not be shielded with a ceramic cover means. On the other hand, the lithium anode 24 is incompatible with the glass and the ceramic cover means must shield at least those portions of the glass which are exposed to the lithium. This invention is intended to encompass situations in which the inner portions of glass are protected in their entirety and those situations where only part of the surface need be shielded as is dictated by the design in which the feedthrough is to be used or other considerations.

The preferred ceramic for cover means 16 is alumina which has been found to function very satisfactorily with glass and with metal from the standpoint of thermal expansion.

Having described the invention, the exclusive rights and privileges thereto are to be defined by the following claims in the light of the foregoing description:

What I claim is:

1. An electrochemical cell comprising a case including electrode means; electrode lead-wire means extending into the case from the exterior thereof to contact the electrode means; glass seal means around the lead-wire means at its point of entry into the case with an inner glass portion extending inside the case, and ceramic cover means surrounding the lead-wire means and extending between the glass and the electrode means, the ceramic cover means being fused to the inner glass portion of the glass seal means inside the case and shielding those inner portions of the glass inside the case which are exposed to cell contents which tend to react with the glass whereby reaction between the cell contents and the glass and the cell contents and the lead-wire means is avoided.

2. The cell of claim 1 wherein the ceramic cover is comprised of alumina.

3. The cell of claim 1 wherein the electrode means includes an anode comprised of lithium.

4. The cell of claim 1 wherein the electrode means includes a cathode comprised of an organic complex compound including iodine.

5. The cell of claim 3 wherein the ceramic cover is cup-shaped.

6. The cell of claim 4 wherein the electrode means includes a lithium anode and the complex compound of the cathode substantially surrounds the lithium anode.

7. The cell of claim 3 wherein the glass seal means comprises a glass portion and a separate peripheral metal portion sealed to the glass, the metal portion being also sealed to the case.

* * * * *